Figure 1:
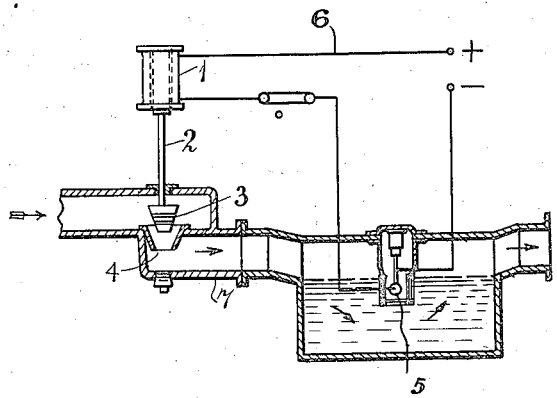

V. HENRI, A. HELBRONNER & M. VON RECKLINGHAUSEN.
TREATMENT OF WATER AND OTHER LIQUIDS BY ULTRA-VIOLET RAYS.
APPLICATION FILED DEC. 31, 1910. RENEWED JAN. 14, 1915.

1,150,117.

Patented Aug. 17, 1915.

WITNESSES

INVENTORS

UNITED STATES PATENT OFFICE.

VICTOR HENRI, ANDRÉ HELBRONNER, AND MAX VON RECKLINGHAUSEN, OF PARIS, FRANCE, ASSIGNORS, BY MESNE ASSIGNMENTS, TO THE R. U. V. COMPANY, INC., A CORPORATION OF NEW YORK.

TREATMENT OF WATER AND OTHER LIQUIDS BY ULTRA-VIOLET RAYS.

1,150,117.   Specification of Letters Patent.   Patented Aug. 17, 1915.

Original application filed October 31, 1910, Serial No. 589,995. Divided and this application filed December 31, 1910, Serial No. 600,323. Renewed January 14, 1915. Serial No. 2,278.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented a new and useful Improvement Relating to the Treatment of Water and other Liquids by Ultra-Violet Rays, of which the following is a specification, this application being a division of application Serial No. 589,995, filed October 31, 1910.

This invention relates to the treatment and sterilization of liquids by means of ultra-violet rays, and particularly to the sterilization of such liquids as are only slightly or not at all opaque to the rays, and has for its object the construction of apparatus suitable for the purpose.

In a co-pending application, Serial No. 589,995, filed 31st October 1910, we describe apparatus for treating liquids by means of ultra-violet rays and the preferred source of rays therein indicated is a mercury vapor lamp provided with a quartz container.

It is desirable that the sterilizing appratus should operate as far as possible automatically and for this reason the plant is provided with an automatic cut-off, adapted to stop the flow of water through the apparatus in case of breakage or failure of a lamp. Such a device for instance may consist of an electro-magnet connected in series with the lamp and operatively connected to a water valve so that when the current fails on account of a defect in a lamp, the flow of water to the sterilizer is cut off. It has furthermore been found that the form of lamp which is preferably employed for sterilizing purposes takes a much larger current when started than when it is in normal operation, and the quantity of ultra-violet rays emitted during the starting period is less than during the normal period. An electro-magnetically operated device may therefore be connected in the water supply system, which retards the flow of water until the lamp is operating normally. In this way the passage of water through the apparatus at a rate which is too rapid in proportion to the amount of ultra-violet rays available to effect thorough sterilization is prevented.

In order that the nature of our invention may be clearly understood we will now proceed to describe the same with reference to the accompanying drawings in which—

Figure 2:
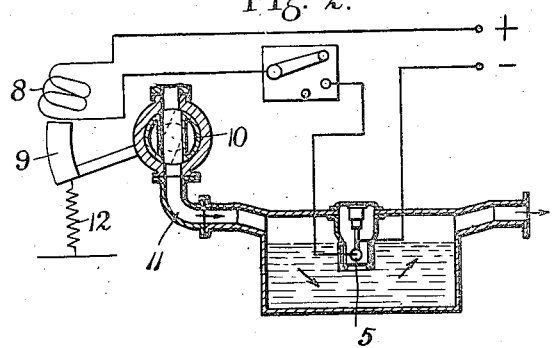

Figure 1 shows by way of example and diagrammatically a cut-out device adapted to cut off the supply of water to the sterilizing element in case of failure of a lamp and Fig. 2 shows diagrammatically an electrically operated device for retarding the passage of water through the apparatus when the lamp is being started up.

Referring to the diagram shown in Fig. 1, the device comprises an electro-magnet 1, to the armature of which is connected a rod 2 supporting a conical valve 3. When closed the valve rests in the seat 4 and passage of the water is prevented. When the lamp 5, which is connected in the same circuit 6 as the electro-magnet, is in operation the armature is raised, thus opening the valve and allowing the water to flow through the pipe 7 into the sterilizing element. In the event therefore of failure of a lamp from any cause the flow of water through the sterilizing element is automatically cut off.

The general arrangement of the device used for retarding the flow of water during the starting period before the lamp has attained its normal state of operation is shown diagrammatically in Fig. 2. A device of this character is necessary because, as hereinbefore mentioned, we have found that a vapor electric lamp does not attain its full capacity for emitting ultra-violet rays until some time after it has been started. Consequently, during this time if the water or other liquid to be sterilized be permitted to flow past the lamp at its normal rate it will not be sufficiently sterilized during this period of time. On the other hand, during this starting period the quantity of electricity absorbed by the lamp is much greater than in normal working. For instance, in the case of mercury vapor lamps, a lamp which normally takes a current of about three amperes will require a current of about seven amperes when starting. We therefore establish a correspondence between the quantity of current taken by the lamp and the amount of water flowing through the apparatus and proportion this quantity to the rate of action of the lamp. For this purpose we provide in series with the mercury vapor lamp an electro-magnet or solenoid 8 connected in the same circuit as the lamp 5, the armature 9 of said electro-magnet being connected with a valve 10 controlling the supply of water through the pipe 11. This electro-magnet is so designed that when it is traversed by the large current which the mercury vapor lamp 5 takes at starting, the armature or core is attracted into the position shown in dotted lines in which the water valve 10 is partly closed. When the strength of the electric current diminishes the valve is permitted to open again under the influence of the spring 12 until when the lamp is taking its normal current and emitting its full amount of ultra-violet rays the maximum flow of water past the lamp is permitted. In place of connecting the electromagnetic device in series with the lamp it may be found desirable to connect it in a shunt across the terminals of the lamp, in which case a suitable variation will be made in the manner in which it operates the water valve.

It will be understood that many different ways of carrying out the invention in practice may be devised, for example, advantage may be taken of the thermal effects of the electric current for the purpose of operating the water valve in accordance with the current strength in place of the electro-magnetic effects.

We claim as our invention:—

1. Apparatus for sterilizing liquids comprising in combination a chamber through which the liquid is permitted to flow, a mercury vapor lamp emitting rays of short wave length, means for exposing the liquid to such rays during its passage through the chamber and automatic means for reducing the flow of liquid when the current passing through the lamp is larger than the normal.

2. Apparatus for sterilizing liquids comprising in combination a chamber through which the liquid is permitted to flow, a mercury vapor lamp emitting rays of short wave length, means for exposing the liquid to such rays during its passage through the chamber and means operated by the current passing through the lamp for reducing the flow of liquid when said current is larger than the normal.

3. Apparatus for sterilizing liquids by means of ultra-violet rays, the combination of a sterilizing chamber, an inlet pipe leading to such sterilizing chamber, a valve in said pipe, a lamp capable of emitting ultra-violet rays, and means whereby said valve is operated to reduce the flow of liquid to the sterilizing chamber when the current passing through the lamp is larger than the normal.

4. In apparatus for treating liquids by means of ultra-violet rays, the combination of a valve adapted to admit liquid to the apparatus, a lamp capable of emitting ultra-violet rays and means for retarding the passage of liquid through said valve when the current taken by the lamp exceeds its normal value.

5. In apparatus for treating liquid by means of ultra-violet rays, the combination of a valve, an electro-magnet adapted to operate said valve and a lamp capable of emitting ultra-violet rays connected in series with said electro-magnet, said valve being constructed to retard the passage of liquid when the electro-magnet is energized above a certain predetermined degree.

In testimony whereof we have hereunto subscribed our names this 16" day of December 1910.

VICTOR HENRI.
ANDRÉ HELBRONNER.
MAX von RECKLINGHAUSEN.

Witnesses:
DEAN B. MASON,
JACK H. BAKER.